Feb. 13, 1968
W. J. DAILEY ET AL
3,368,599
FLEXIBLE STRUCTURE CLOSURE
Filed March 18, 1966
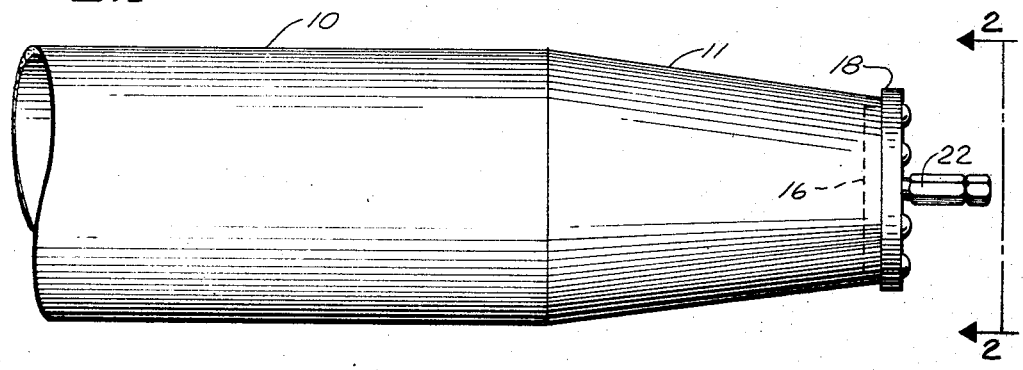
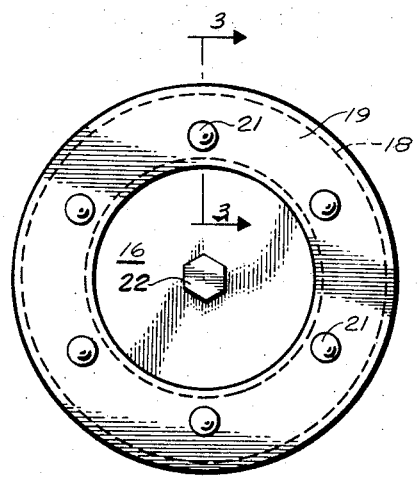
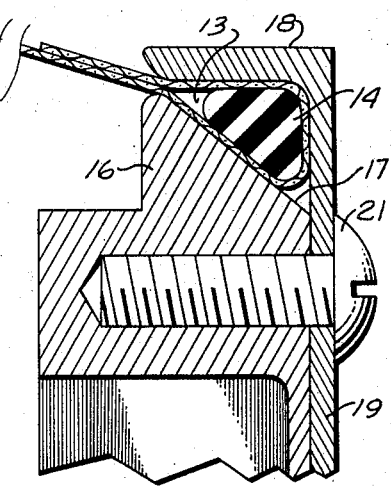
INVENTORS
WILLIAM J. DAILEY
ARCHIE B. MILLER
BY
Richard D. Seibel
ATTORNEY

United States Patent Office 3,368,599
Patented Feb. 13, 1968

3,368,599
FLEXIBLE STRUCTURE CLOSURE
William J. Dailey, Santa Fe Springs, and Archie B. Miller, La Habra, Calif., assignors to North American Rockwell Corporation, a corporation of Delaware
Filed Mar. 18, 1966, Ser. No. 535,405
1 Claim. (Cl. 150—8)

ABSTRACT OF THE DISCLOSURE

A flexible inflatable tubular boom for a flexible wing vehicle has a normally circular, resilient, peripheral enlargement at an open end thereof which is sealed by inserting therein a plate with a peripheral chamfer. A ring with an integral flange is bolted onto the plate to form a triangular enclosure for the normally circular enlargement which is thereby deformed to a flattened three-sided figure in sealing engagement with the chamfer for sealing of the tube and providing mechanical connection means therewith.

---

Flexible inflatable structures have been employed for many applications such as, for example, as rigidifying members or booms for flexible wing vehicles. Ends on such members in the past have been fabricated of curved sections cemented or stitched together to form an all flexible closure. It is found in many applications that a rigid closure is preferable.

It is therefore an object of this invention to provide a closure for an inflatable structure.

Thus in the practice of this invention according to a preferred embodiment there is provided a flexible tube with a peripheral enlargement at the end thereof. A rigid plate is fitted within the end of the tube, the outside diameter of the plate being substantially the same as the inside diameter of the tube adjacent the end thereof. A chamfer is provided around the periphery of the plate. A rigid ring having an internal flange is bolted to the rigid plate and the ring and flange cooperate with the peripheral chamfer on the plate to define a peripheral enclosure for the enlargement at the end of the flexible tube. The ring fits over a portion of the outside of the tube so as to contain the end enlargement in the enclosure and hence seal the end of the flexible tube. Mechanical or pneumatic connections can readily be made to the flexible tube by means of the rigid plate.

Thus, it is a broad object of this invention to provide a closure for a flexible tube.

Is is another object to provide a means for making connections to a flexible tube.

Other objects and many of the attendant advantages of this invention will be readily apparent as the same becomes better understood by reference to the following detailed description and accompanying figures wherein:

FIG. 1 illustrates a closure for a pressurized flexible structure;

FIG. 2 is an end view of the closure of FIG. 1; and

FIG. 3 is a partial cross section of the closure of FIG. 1.

Throughout the drawings like reference numerals refer to like parts.

FIGS. 1 and 2 illustrate two views of an end closure incorporating the principles of this invention. As illustrated in this embodiment there is provided a pressurized flexible cylindrical tube 10 that is preferably constructed from conventional rubberized fabric so that leakage through the flexible tube is minimized. In the tube illustrated in the preferred embodiment there is provided a truncated conical section 11 at the end of the cylindrical tube 10. Although only one end of the tube is shown in detail, it will be apparent that the other end may be closed by any suitable means or by a closure identical to that illustrated herein. The conical section of the tube is preferably fabricated of rubberized fabric and is secured to the cylindrical tube by a circumferential reinforcing strip of fabric 12 that is preferably stitched or cemented to both the cylindrical tube and the conical section. As is more clearly illustrated in FIG. 3, the smaller end of the conical section 11 includes a peripheral enlargement 13 which is preferably made by wrapping a portion of the fabric in the conical section around a rubber O-ring 14. The rubberized fabric is then cemented or stitched in place around the rubber O-ring to provide a resilient and relatively smooth surfaced end enlargement 13 at the periphery of the flexible tube. It will be apparent to one skilled in the art that a peripheral enlargement can be provided on a cylindrical tube rather than the conical section illustrated. Although an inflatable structure of tubular configuration having a circular opening is illustrated, it will be readily apparent that the described closure is applicable to other structures or containers whether rigid or flexible, of other geometric configurations, having flexible openings or end portions that may be of non-circular geometry.

A rigid plate 16, which in a preferred embodiment is made from aluminum, is fitted within the flexible tube and has an external diameter to provide a relatively close fit within the inside of the conical section of the flexible tube near the end enlargement 13. The outside diameter of the metal plate 16 preferably is larger than the inside diameter of the resilient O-ring 14 for good sealing. A chamfer 17 is provided on the metal plate 16 around the periphery thereof. The chamfer in a preferred embodiment extends between the outer diameter of the plate to one face thereof at about a 45° angle and serves as a seat for the peripheral enlargement 13.

A rigid ring 18 is fitted over the external diameter of the metal plate and has an internal diameter greater than the external diameter of the plate 16 with sufficient clearance for the doubled thickness of fabric at the end of the tube. An integral annular flange 19 extends inwardly on one side of the ring 18 and is secured to the metal plate 16 by a series of bolts 21. It will be apparent that other fastening means can be employed in other embodiments. The ring 18 and flange 19, and the chamfer 16 on the plate cooperate to define a peripheral enclosure therebetween. The enclosure has a substantially triangular cross section that is small than a triangle that would exactly circumscribe a circle having the diameter of the O-ring so as to deform the normally circular cross section O-ring 14 into a flattened three sided figure when the O-ring is contained within the peripheral enclosure and the flange 19 is pulled toward the plate 16 by bolts 21.

A valve 22 is provided in the center portion of the plate 16 and extending through the center of the ring 18. This valve communicates with the interior of the flexible tube and can readily be employed for inflation or deflation of the tube or as a safety valve. It will be apparent to one skilled in the art that a mechanical connection can be made to the tube by way of the plate rather than the pneumatic connection 22 illustrated. Thus, for example, a clevis can be attached to the plate so that the inflatable tube can be connected with another inflatable tube or some other structure. By employing an end closure as described and illustrated, connections are made to the end of the tube rather than a side of the tube and bending moments on the tube are minimized. Other structures may be readily attached and detached as required.

In assembling a closure of the type illustrated the plate 16 is fitted within the end of the flexible tube so that the O-ring 14 fits against the peripheral chamfer 17. No problem is encountered in inserting a plate because of the flexibility and resiliency of the tube and O-ring. The ring 18 with the flange 19 thereon is bolted to the plate so as to surround the O-ring and contain and deform it in the peripheral enclosure. The fabric forming conical section 11 of the flexible tube passes through the clearance between the outside diameter of the plate 16 and the inside diameter of the ring 18. The deformed O-ring is tightly pressed against the peripheral chamfer 17 and this provides a pneumatic seal for the flexible tube. If desired a grease can be applied to the end enlargement 13 to help provide a leak free seal. The valve 22 can then be employed for inflating the flexible tube to any desired pressure.

It will be apparent that many modifications and variations can be made in the present invention without departing from the spirit of this invention. Thus, for example, rather than an elongated tube, the flexible member can be a short tubular connection on a larger flexible body such as an inflatable shelter or the like. It is therefore to be understood that within the scope of the appended claim this invention may be practiced otherwise than as specifically described.

What is claimed is:

1. A light weight rigidifying boom for a flexible wing vehicle comprising:

a flexible inflatable tube having a cylindrical portion and a truncated conical portion near the end thereof;

a smooth surfaced, resilient peripheral enlargement at the smaller open end of the conical portion for providing a pneumatic seal, said peripheral enlargement comprising a resilient rubber O-ring of normally circular cross-section wrapped within an end portion of the conical portion of the tube;

a rigid internal plate within the end of the flexible tube, the outside diameter of the plate being greater than the inside diameter of the flexible tube adjacent the end thereof, and having a peripheral chamfer facing away from the cylindrical portion of said tube for providing sealing seat for said peripheral enlargement;

a pneumatic connection on said internal plate for inflating said flexible tube;

a locking ring fitted over the external diameter of the internal plate, said ring having an internal diameter sufficiently greater than the external diameter of said plate for providing clearance for a doubled thickness of said flexible tube and substantially less than the cross-section of the O-ring;

an inwardly extending integral flange on said ring; said flange, said ring, and the chamfer on said plate cooperating to define a peripheral enclosure containing said peripheral enlargement, said enclosure having a triangular cross-section that is smaller than a triangle that would exactly circumscribe a circle having the diameter of said O-ring so that said O-ring is resiliently deformed into a flattened three-sided figure in said peripheral enclosure for providing a pneumatic seal between said peripheral enlargement and the chamfer on said plate for inflation of said tube; and means for securing the flange of said locking ring to said internal plate.

References Cited

UNITED STATES PATENTS 3,133,575   5/1964   Slemmons _____ 150—1

DONALD F. NORTON, *Primary Examiner.*

FRANKLIN T. GARRETT, *Examiner.*